US010023204B1

(12) United States Patent
Kim et al.

(10) Patent No.: US 10,023,204 B1
(45) Date of Patent: Jul. 17, 2018

(54) DRIVING ASSISTING METHOD AND DRIVING ASSISTING DEVICE USING THE SAME

(71) Applicant: StradVision, Inc., Gyeongsangbuk-do (KR)

(72) Inventors: Hak-Kyoung Kim, Seoul (KR); Hongmo Je, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/828,581

(22) Filed: Dec. 1, 2017

(51) Int. Cl.
*B60Q 1/00* (2006.01)
*B60W 50/14* (2012.01)
*B60Q 9/00* (2006.01)
*G06K 9/00* (2006.01)
*G08G 1/16* (2006.01)
*B60W 40/08* (2012.01)

(52) U.S. Cl.
CPC ............. *B60W 50/14* (2013.01); *B60Q 9/008* (2013.01); *G06K 9/00805* (2013.01); *G06K 9/00845* (2013.01); *G08G 1/166* (2013.01); *G08G 1/167* (2013.01); *B60W 2040/0872* (2013.01); *B60W 2050/143* (2013.01); *B60W 2550/10* (2013.01); *B60W 2550/30* (2013.01)

(58) Field of Classification Search
CPC ........... B60W 50/14; B60W 2050/143; B60W 2550/30; G06K 9/00805; G06K 9/00845; G08G 1/166; G08G 1/167
USPC .......................................................... 340/439
See application file for complete search history.

(56) References Cited

U.S. PATENT DOCUMENTS

| 8,890,674 | B2 * | 11/2014 | Zeiger | B60W 50/14 |
| | | | | 340/439 |
| 9,262,924 | B2 * | 2/2016 | McNew | G08G 1/167 |
| 2005/0060117 | A1 * | 3/2005 | Kunzler | G08G 1/166 |
| | | | | 702/149 |

* cited by examiner

*Primary Examiner* — John A Tweel, Jr.
(74) *Attorney, Agent, or Firm* — Husch Blackwell LLP

(57) ABSTRACT

A driving assisting method is provided. The driving assisting method includes steps of: (a) a driving assisting device performing processes of (i) determining a gazing direction of a driver of a vehicle and (ii) identifying location of a specific object and determining distance between the specific object and the vehicle; and (b) the driving assisting device (i) maintaining or increasing threshold level of a triggering condition for providing alarm or (ii) providing the alarm, if the location of the specific object is detected as being outside a virtual viewing frustum corresponding to the gazing direction of the driver and if the distance between the specific object and the vehicle is determined as being less than at least one predetermined distance.

30 Claims, 10 Drawing Sheets

DETECTING A GAZING DIRECTION

DETECTING EXTERNAL OBJECT

DRIVING ASSISTING METHOD AND DRIVING ASSISTING DEVICE USING THE SAME

FIELD OF THE INVENTION

The present invention relates to a driving assisting method using a driving assisting device equipped within a vehicle, and more particularly, to the driving assisting method comprising steps of (a) the driving assisting device performing processes of (i) determining a gazing direction of a driver of a vehicle and (ii) identifying a location of a specific object and determining a distance between the specific object and the vehicle; and (b) the driving assisting device (i) maintaining or increasing a threshold level of a triggering condition for providing alarm or (ii) providing the alarm according to the threshold level of the triggering condition, if the location of the specific object is detected as being outside a virtual viewing frustum corresponding to the gazing direction of the driver and if the distance between the specific object and the vehicle is determined as being less than at least one predetermined distance; and the driving assisting device using the same.

BACKGROUND OF THE INVENTION

Recently, in order to increase the safety of driving, ADAS (Advanced Driver Assistance system) have been installed in the vehicles. Various systems such as LDWS (Lane Departure Warning system), FCWS (Forward Collision Warning System), DDD (Driver Drowsiness Detection), PD (Pedestrian Detection), TSR (Traffic Sign Recognition), and BSD (Blind Spot Detection) etc. are examples of the ADAS.

Some ADAS systems merely monitor lane departure, an access of external objects and so forth regardless of a gazing direction of a driver of a vehicle. Other ADAS systems may repeatedly monitor whether or not the gazing direction of the driver of the vehicle is directed towards the front. However, there are a lot of situations of giving unnecessary alarm or skipping important alarm.

SUMMARY OF THE INVENTION

It is an object of the present invention to solve the problems described above.

It is another object of the present invention to provide a driving assisting method that informs a vehicle driver of a fact that an external object is approaching by judging that the vehicle driver fails to recognize sudden appearance of the external object.

It is still another object of the present invention to provide the driving assisting method that provides alarm in case that the external object suddenly approaches either from a direction opposite to a gazing direction of the vehicle driver or from regions outside a virtual viewing frustum of the vehicle driver.

In accordance with one aspect of the present invention, there is provided a driving assisting method using a driving assisting device, including steps of: (a) the driving assisting device performing processes of (i) determining a gazing direction of the vehicle driver and (ii) identifying a location of a specific object and determining a distance between the specific object and the vehicle; and (b) the driving assisting device (i) maintaining or increasing a threshold level of a triggering condition for providing alarm or (ii) providing the alarm according to the threshold level of the triggering condition, if the location of the specific object is detected as being outside a virtual viewing frustum corresponding to the gazing direction of the vehicle driver and if the distance between the specific object and the vehicle is determined as being less than at least one predetermined distance.

In accordance with another one aspect of the present invention, there is provided a driving assisting device including a communication part for acquiring information on a driver of a vehicle and information on a specific object outside the vehicle; and a processor for performing processes of (I)(i-1) determining a gazing direction of the driver and (i-2) identifying a location of the specific object and determining a distance between the specific object and the vehicle; and (II)(ii-1) maintaining or increasing a threshold level of a triggering condition for providing alarm or (ii-2) (providing the alarm according to the threshold level of the triggering condition, if the location of the specific object is detected as being outside a virtual viewing frustum corresponding to the gazing direction of the driver and if the distance between the specific object and the vehicle is determined as being less than at least one predetermined distance.

BRIEF DESCRIPTION OF THE DRAWINGS

The drawings attached below are to explain example embodiments of the present invention and are only part of preferred embodiments of the present invention. Other drawings may be obtained based on the drawings herein without inventive work for those skilled in the art. The above and other objects and features of the present invention will become conspicuous from the following description of preferred embodiments given in conjunction with the accompanying drawings, in which.

DETAILED DESCRIPTION OF THE PREFERRED EMBODIMENTS

Figure 1A:
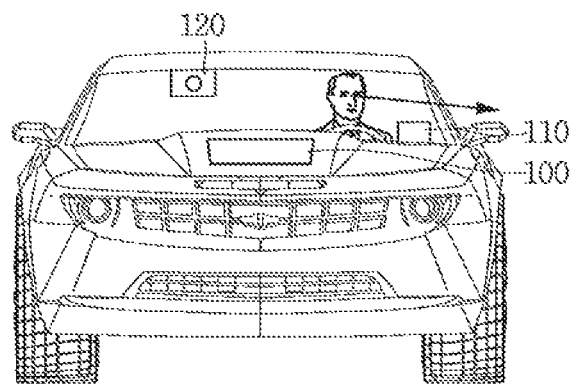
FIGS. 1A and 1B are drawings conceptually illustrating a detection of a gazing direction of a vehicle driver and a detection of an external object in accordance with the present invention.

To make purposes, technical solutions, and advantages of the present invention clear, reference is made to the accompanying drawings that show, by way of illustration, more detailed example embodiments in which the invention may be practiced. These preferred embodiments are described in sufficient detail to enable those skilled in the art to practice the invention.

It is to be appreciated that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be appreciated that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art may easily implement the present invention.

Figure 1B:
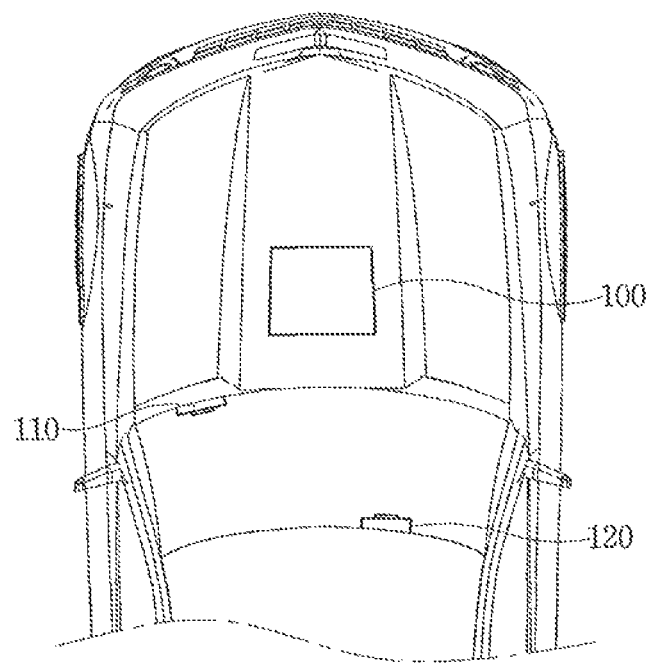

FIGS. 1A and 1B are drawings conceptually illustrating a detection of a gazing direction of a driver of a vehicle, i.e., a vehicle driver, and a detection of an external object in accordance with the present invention.

The driving assisting device 100 in accordance with the present invention includes a communication part (not shown) and a processor (not shown). Also, the driving assisting device 100 may further include one or more internal cameras 110, i.e, first cameras, and one or more external cameras 120, i.e., second cameras. As another example, the internal cameras 110 and the external cameras 120 may be independent devices which are separate from the driving assisting device 100. The internal cameras 110 may be utilized to acquire images of the vehicle driver whereas the external cameras 120 may be utilized to acquire images of surroundings of the vehicle. For example, one external camera 120 built on the vehicle may be rotated at more than a predetermined angle to cover the surroundings of the vehicle. As another example, multiple external cameras 120 may acquire respective images corresponding to their respective angles to cover the surroundings of the vehicle. Meanwhile, the driving assisting device 100 may be mounted on a vehicle, or at least part of components of the driving assisting device 100 may be located outside the vehicle.

Moreover, the communication part may acquire data from one or more predetermined sensors. Herein, the data may include information on the vehicle driver, information on a specific object, and information on surroundings of the vehicle.

The processor is configured to perform processes of determining a gazing direction of the vehicle driver, a location of the specific object and a distance between the specific object and the vehicle.

In addition, the processor is configured to maintain or increase a threshold level of triggering condition for providing alarm or provide the alarm if it is determined that the location of the specific object is detected outside a virtual viewing frustum corresponding to the gazing direction of the vehicle driver and that the distance between the specific object and the vehicle is determined as being less than at least one predetermined distance.

Herein, the so-called "threshold level" is a threshold distance between two objects, e.g., the vehicle and the specific object, as a condition for provoking the alarm, and "increasing the threshold level" stands for a case in which the threshold distance is increased to provide the alarm more earlier due to an appearance of a more risky object. For example, one condition that the threshold level of the triggering condition for providing the alarm is 30 meters, if a more risky object is detected as being located outside the virtual viewing frustum corresponding to the gazing direction of the vehicle driver, the processor may increase the threshold level of the triggering condition to 50 meters. Thus, the alarm may be given even if the distance between the vehicle and the more risky object is 50 meters because it is more likely to be developed into a more urgent situation.

Further, a case in which the distance is determined as being less than at least one predetermined distance may refer to a case in which the specific object is moving from a location farther than the predetermined distance to a location nearer than the predetermined distance.

Additionally, it is possible to recognize the gazing direction of the vehicle driver by referring to image data acquired from the internal cameras installed in the vehicle. Besides, it is possible to determine the virtual viewing frustum corresponding to the gazing direction of the vehicle driver on the basis thereof.

Specifically, it is possible to detect an appearance of the external object by referring to image data acquired from the external cameras installed on the vehicle. For a reference, it is assumed that the external cameras 120 are being utilized to measure the distance between the vehicle and the specific object, but it is not limited thereto. It may be appreciated that any means for measuring the distance between the vehicle and the specific object, e.g., ultrasonic sensor etc., may be used as a substitute.

Figure 2:
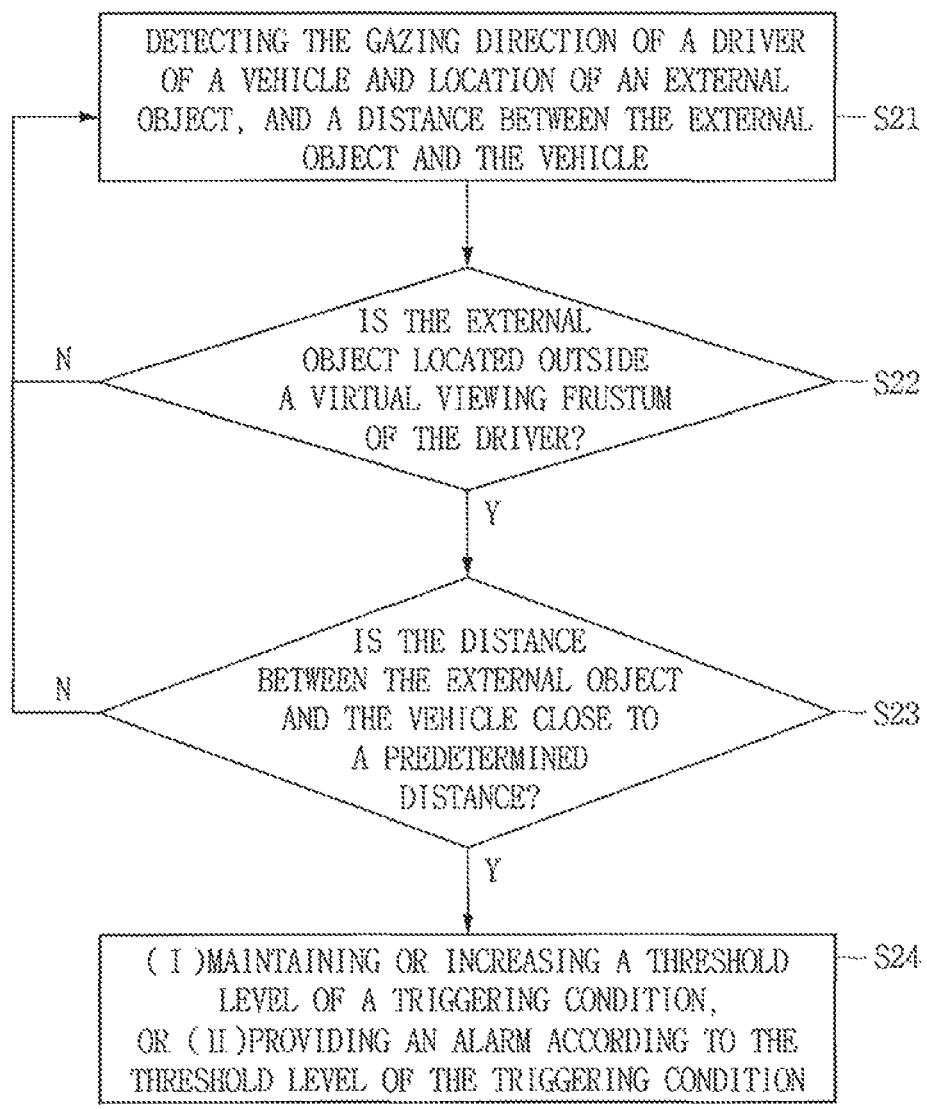
FIG. 2 is a flowchart schematically illustrating a driving assisting method in accordance with the present invention.

FIG. 2 is a flowchart schematically illustrating a driving assisting method in accordance with the present invention.

Referring to FIG. 2, first, at a step of S21, the driving assisting method may acquire information on the gazing direction of the vehicle driver by referring to the image data obtained from the internal cameras, and may acquire information on the location of the specific object and information on the distance between the specific object and the vehicle by referring to the image data acquired from the external cameras. Next, at step of S22, the driving assisting device may determine if the specific object is located outside the virtual viewing frustum corresponding to the gazing direction of the vehicle driver. In case that the specific object is located outside the virtual viewing frustum, the driving assisting device may determine if the distance between the vehicle and the specific object is less than a predetermined distance at step of S23.

If it is determined that the vehicle and the specific object are close to each other by less than the predetermined distance, the driving assisting device may maintain or increase the threshold level of the triggering condition for providing alarm or provide the alarm according to the threshold level of a triggering at step of S24.

For a reference, in flowchart of FIG. 2, though the step S23 is illustrated as if it is performed sequentially after the step S22, the step S22 and the step S23 may be performed in parallel at the same time. As still another example, the step S23 may be performed first and then the step S22 may be performed.

The flowchart shown in FIG. 2 may be further specified as below. That is, on the condition that the location of the specific object is detected outside the virtual viewing frustum corresponding to the gazing direction of the vehicle driver, the driving assisting device 100 may perform processes of (i) maintaining or increasing the threshold level of the triggering condition for providing the alarm if the distance between the specific object and the vehicle is determined as being less than a first predetermined distance, and (ii) providing the alarm according to the threshold level of the triggering condition if the distance between the specific object and the vehicle is determined as being less than a second predetermined distance. Herein, the second predetermined distance may be decided according to the threshold level of the triggering condition. Further, the first predetermined distance may be numerically larger than or equal to the second predetermined distance.

Besides, through the steps S22 and S23, if it is determined that the specific object is predicted to be within a third predetermined distance from the vehicle after a certain time by referring to the location of the specific object and a change in the distance between the specific object and the vehicle, the driving assisting device may discern that the vehicle is in a collision radius from the specific object. Herein, the third predetermined distance may be numerically smaller than or equal to the second predetermined distance.

Further, at the step S24, volume of the alarm may be adjustable by referring to information on the distance between the specific object and the vehicle. For example, the volume of the alarm may be increased inversely proportional to the distance between the specific object and the vehicle.

Figure 3:
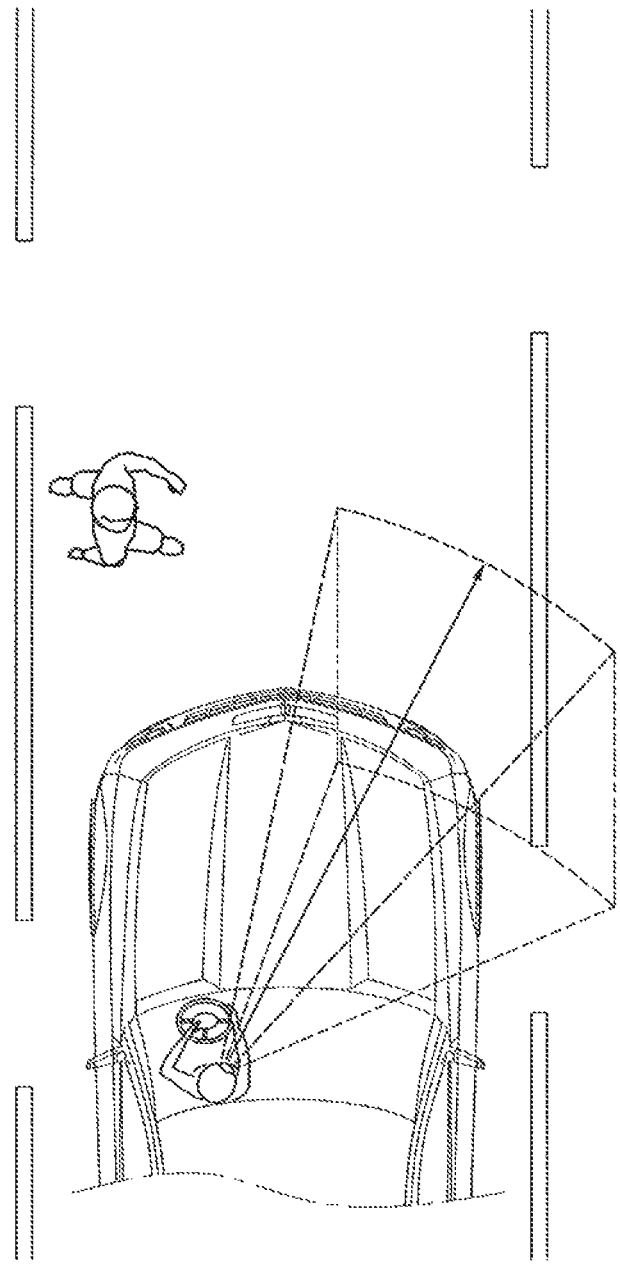
FIGS. 3 and 4 are drawings showing a detection of an external object based on the gazing direction of the vehicle driver in accordance with examples of the present invention.
Figure 4:
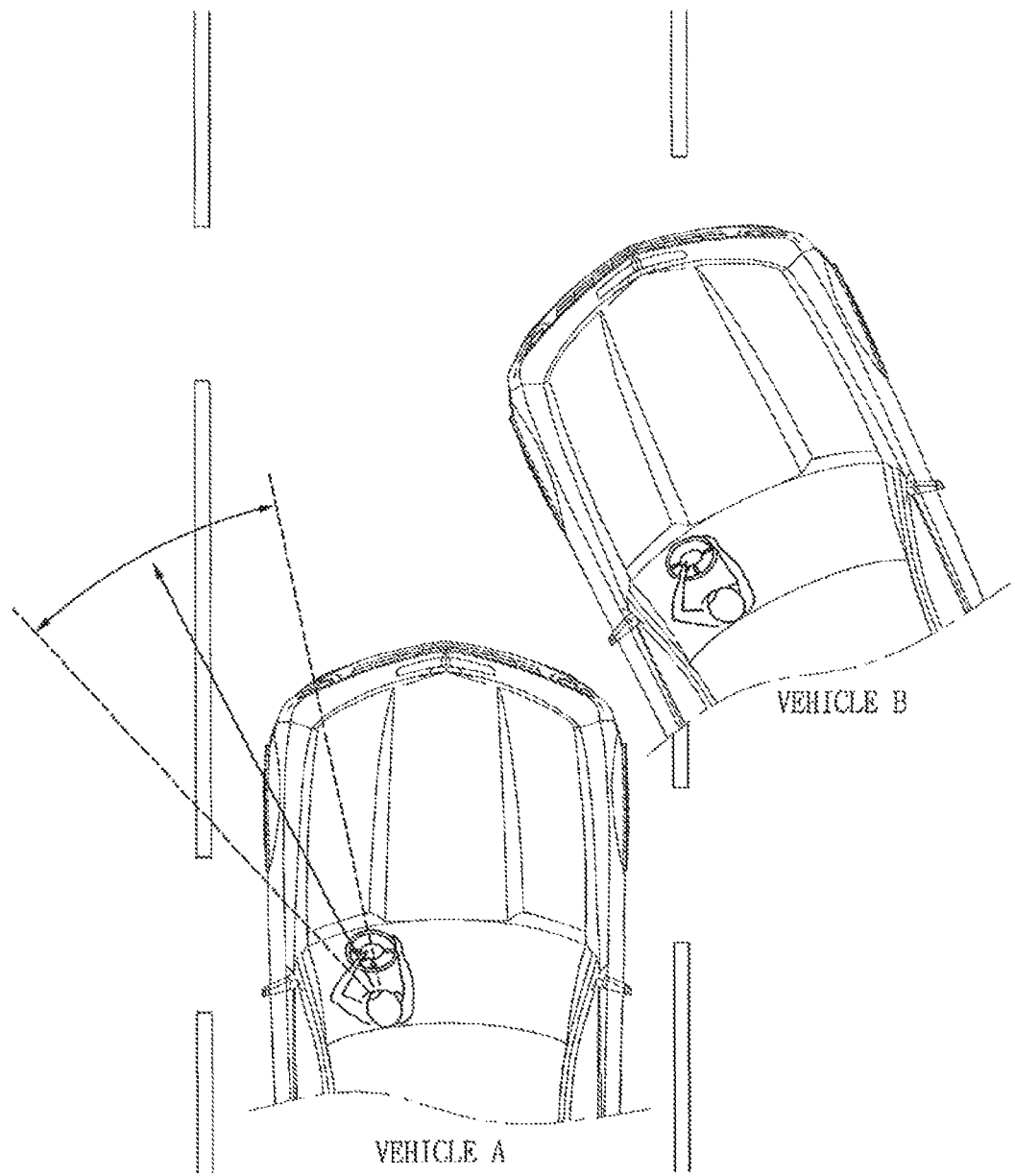

FIGS. 3 and 4 are drawings showing a detection of an arbitrary object based on a gazing direction of a particular vehicle driver in accordance with examples of the present invention.

Referring to FIG. 3, a solid line with an arrow represents the gazing direction of the particular vehicle driver, whereas dotted lines denoted on both sides of the solid line represent a scope of a virtual viewing frustum of the particular vehicle driver. In FIG. 3, on the condition that the gazing direction of the particular vehicle driver is directed to the right front side of a traveling direction of the vehicle and that a person suddenly appears at the left front side of the vehicle, the driving assisting device 100 may perform processes of maintaining or increasing the threshold level of the triggering condition for providing the alarm or providing the alarm according to the threshold level of the triggering condition.

Contrarily, in case that another object (not shown) appears at the right front side of the vehicle, the driving assisting device 100 may determine the object is in the virtual viewing frustum corresponding to the gazing direction of the particular vehicle driver, and the driving assisting device 100 may not provide the alarm since the particular vehicle driver can recognize the object within the virtual viewing frustum.

Referring to FIG. 4, for example, on the condition that the gazing direction of the driver of vehicle A is directed towards the left front side of the vehicle A, and at the same time another vehicle, i.e., vehicle B, is running on the right side of the vehicle A and is trying to change lane in ahead of the vehicle A, the driving assisting device may determine that the vehicle B is located outside the virtual viewing frustum corresponding to the gazing direction of the driver of the vehicle A, and that the distance between the vehicle A and the vehicle B is close to each other by less than a predetermined distance, and thus the driving assisting device may perform processes of maintaining or increasing the threshold level of the triggering condition for providing the alarm, or of providing the alarm according to the threshold level thereof. For a reference, the virtual viewing frustum of the driver of the vehicle A is shown two-dimensionally for the convenience of illustration.

As another example, in case that the vehicle B is running without changing lanes, the driving assisting device 100 may determine that a location of the vehicle B is positioned outside the virtual viewing frustum corresponding to the gazing direction of the driver of the vehicle A, but the driving assisting device 100 may also determine the moving direction of the vehicle B is not a direction moving towards the vehicle A, and thus not providing the alarm. Certainly, it is possible to perform a process of maintaining or decreasing the threshold level of the triggering condition for providing the alarm in this case.

Further, if the location of the vehicle B is at the right rear side or left rear side of the vehicle A within a predetermined distance from the vehicle A, on condition that the gazing direction of the driver of the vehicle A is detected as being directed towards side mirrors or a room mirror or that the side mirrors or the room mirror are detected as being located within the virtual viewing frustum corresponding to the gazing direction of the driver of the vehicle A, the driving assisting device of the vehicle A may maintain the threshold level of the triggering condition for providing the alarm or may not provide the alarm. When the condition mentioned above are not satisfied, the driving assisting device may increase the threshold level of the triggering condition for providing the alarm or may provide the alarm according to the threshold level of the triggering condition.

For a reference, in the present invention, the concept of "the viewing frustum" may include not only "a direct viewing frustum" but also "an indirect viewing frustum". "The direct viewing frustum" means a virtual viewing frustum derived directly from a line of sight of the vehicle driver, where the line of sight does not pass through any reflecting component such as the side mirrors or the room mirror. And "the indirect viewing frustum" means a virtual viewing frustum derived indirectly from the line of sight of the vehicle driver, where the line of sight passes through any reflecting component such as the side mirrors or the room mirror.

Meanwhile, there may be another cases in which the driver may turn his head back or the driver may look slightly downside to watch a screen of a smartphone or the driver may look upside to adjust the room mirror and so forth. In these cases, the driving assisting device 100 may set information on the location of a specific object as being outside a specific virtual viewing frustum even if the specific object is determined as being located within the specific virtual viewing frustum. In detail, in case that the gazing direction of the vehicle driver is detected as being diverted by more than a predetermined upper angle or a predetermined lower angle from a central axis of the specific virtual viewing frustum acquired when the driver is looking straight forward, the driving assisting device 100 may regard the location of the specific object as being outside the specific virtual viewing frustum regardless of whether the specific object is located within the specific virtual viewing frustum or not.

Figure 5:
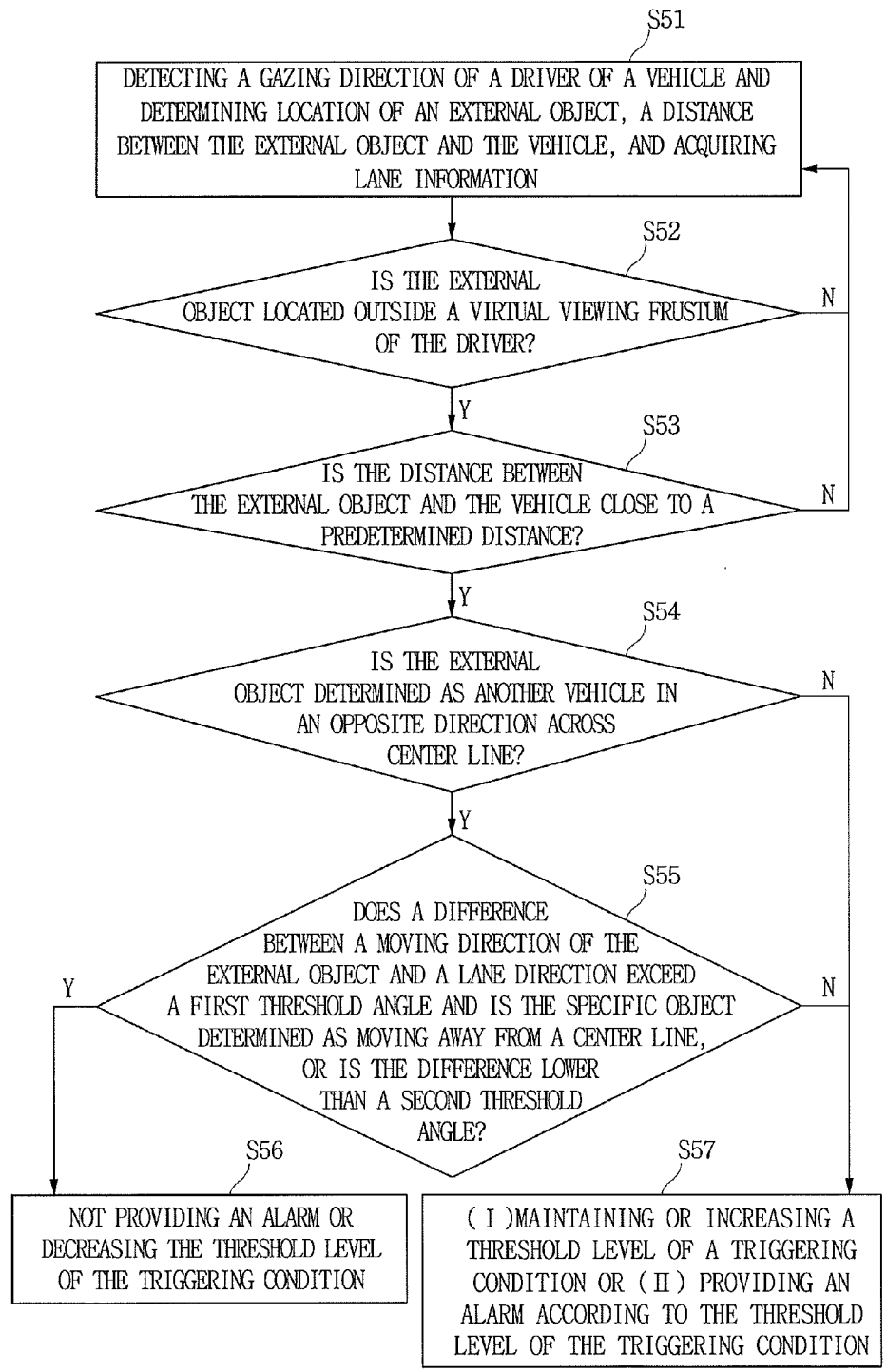
FIG. 5 is a flowchart schematically illustrating an alarm providing method based on lane recognition in accordance with one example embodiment of the present invention.

FIG. 5 is a flowchart schematically illustrating an alarm providing method based on lane recognition in accordance with one example embodiment of the present invention.

In addition, FIGS. 6, 7A, 7B and 8 are drawings illustrating examples of decreasing threshold levels of triggering condition for providing alarm.

Figure 6:
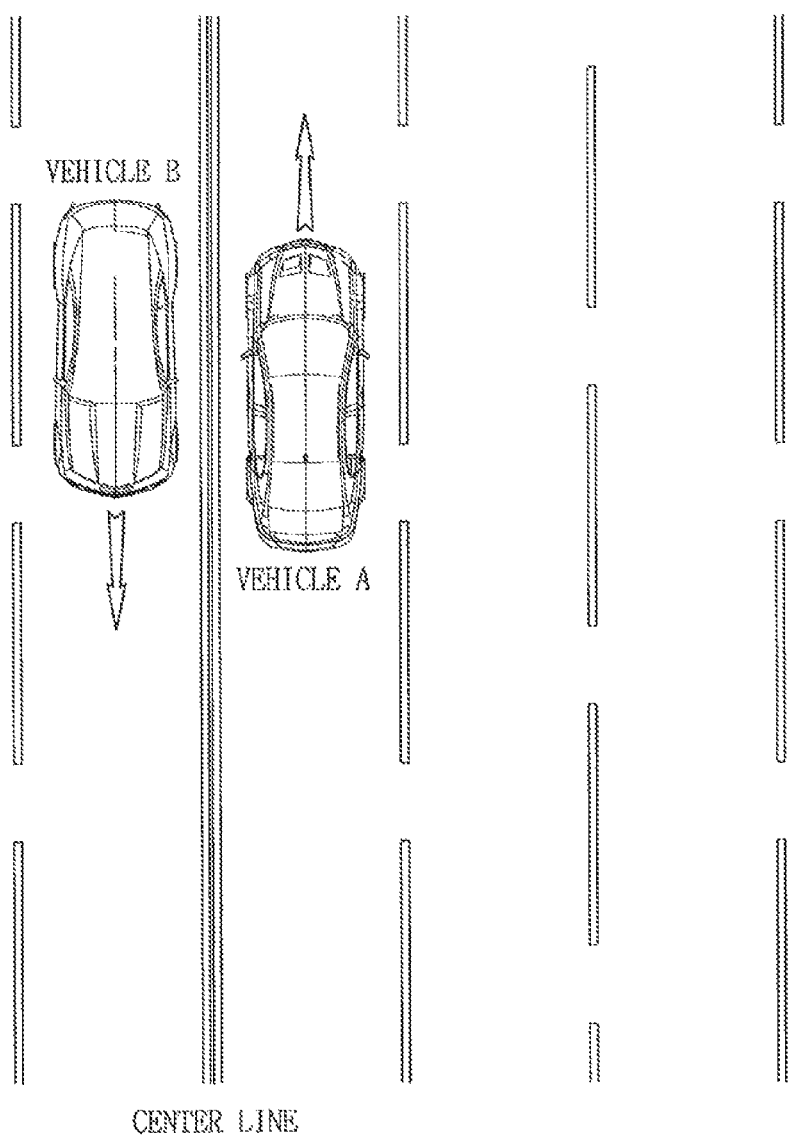
FIGS. 6, 7A, 7B and 8 are drawings illustrating examples of decreasing a threshold level of a triggering condition for providing alarm.

Referring to FIGS. 5 and 6, at a step S51, the communication part of the driving assisting device 100 may detect the gazing direction of the vehicle driver through the internal cameras etc. and may the location of the specific object and recognize the distance between the specific object and the vehicle A. Concurrently, the communication part of the driving assisting device 100 may further acquire lane information. At a step S52, the processor of the driving assisting device may decide if the specific object is located outside the virtual viewing frustum of the vehicle driver by referring to the image data acquired from the external cameras. And at a step S53, the processor of the driving assisting device may determine if the distance between the specific object and the vehicle is close to each other by less than a predetermined distance. At a step S54, if the processor judges that the location of the specific object is located outside the virtual viewing frustum of the vehicle driver and that the distance between the specific object and the vehicle is close to each other by less than the predetermined distance, the driving assisting device 100 may determine whether or not the specific object is another vehicle running in an opposite direction along another lane across a center line by referring to the lane information and information on a moving direction.

If it is determined that said another vehicle is running in the opposite direction across the center line at the step S54, the driving assisting device 100 may determine, at a step S55, (i) if a difference between the moving direction of the specific object and a lane direction included in the lane information exceeds a first preset threshold angle and at the same time if the specific object moving away from the center line, and (ii) if a difference between the moving direction of the specific object and the lane direction is lower than a second preset threshold angle. For reference, the steps S52 to S55 are illustrated as being performed in a sequential manner though, the steps S52 to S55 may be performed in a parallel manner or the steps S52 to S55 may be performed in another sequence.

At the step S55, in case that it is determined that the vehicle B is moving away from the center line with a condition of a difference between the moving direction of the vehicle B and the lane direction included in the lane information exceeding the first preset threshold angle, the driving assisting device may decrease the threshold level of the triggering condition for providing the alarm, or may not provide the alarm at a step S56. That is, the vehicle B is determined as changing lane away from the center line to an outer lane, and thus this is not a case to be determined as perilous.

Besides, at the step S55, with the reference to FIG. 6, in case that it is determined that the difference between the moving direction of the vehicle B and the lane direction included in the lane information is lower than the second preset threshold angle, the driving assisting device may decrease the threshold level of the triggering condition for providing the alarm, or may not provide the alarm at the step S56. That is, the vehicle B is determined as driving normally along its own lane without invading the center line, and hence this is not a case to be recognized as perilous.

For instance, if the threshold level of the triggering condition for provoking the alarm is set to be 10 meters, and when the driving assisting device is set to provide alarm if the distance between an external object and a vehicle is less than 10 meters, the threshold level may be reset to be 5 meters and as a result, the alarm is provoked if the distance between the external object and the vehicle is less than 5 meters. This is a case in which the driving assisting device recognizes situation as a low possibility of accident and thus decreases the threshold level so as not to provide the alarm too often.

At the step S55, in case that it is determined that the difference between the moving direction of the vehicle B and the lane direction included in the lane information exceeds a preset threshold, i.e., a third preset threshold angle, and at the same time the vehicle B is moving towards the center line, the driving assisting device may increase the threshold level of the triggering condition for providing the alarm, or may provide the alarm according to the threshold level of the triggering condition at a step S57.

Moreover, at the step S54, if it is determined that the specific object is a vehicle running in the same direction as the vehicle A, the driving assisting device 100 may determine the specific object is perilous to the vehicle A, and thus the driving assisting device may increase or maintain the threshold level of the triggering condition for providing the alarm or may provide the alarm according to the threshold level of the triggering condition at the step S57.

Figure 7A:
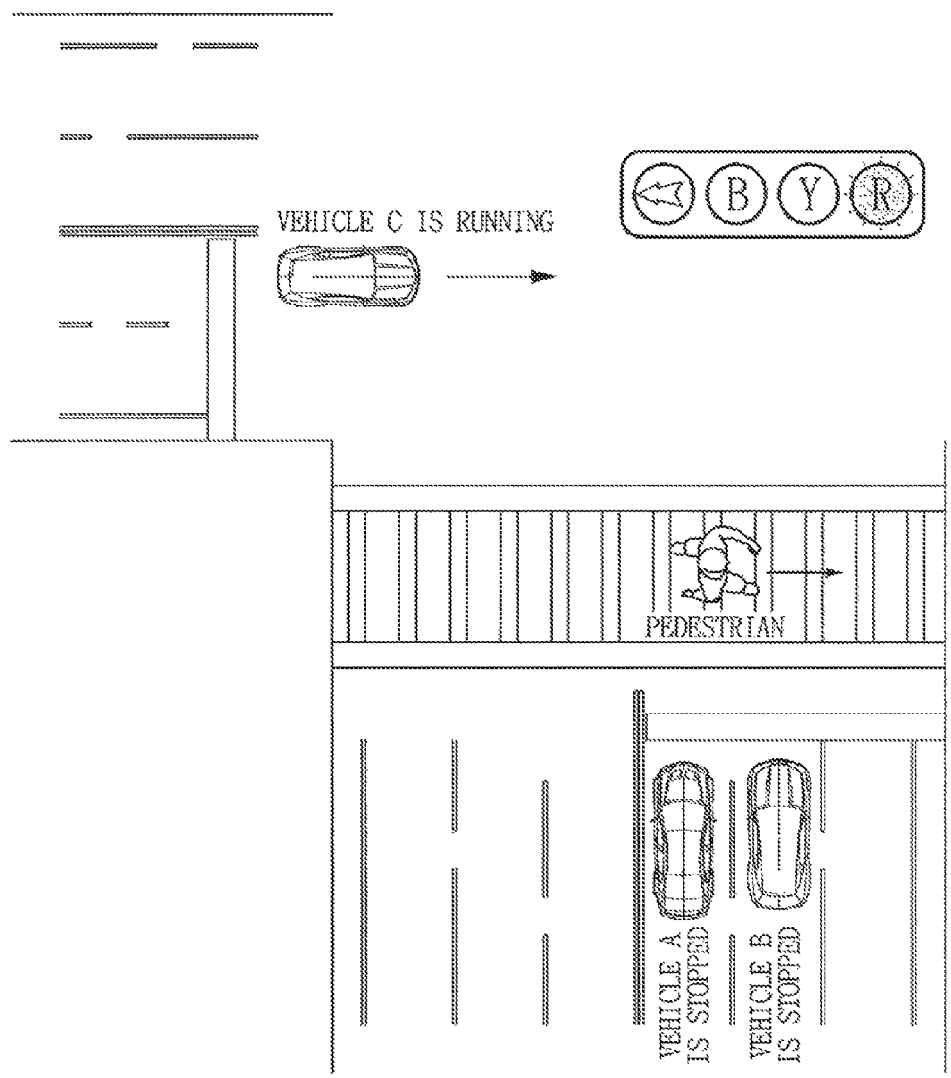

FIG. 7A is a drawing illustrating an instance in which a vehicle A with the driving assisting device is stopped due to a traffic light and a pedestrian and another vehicle C are approaching to a front side of the vehicle A.

Referring to FIG. 7A, the driving assisting device may acquire the information on the traffic signal of the roads on which the vehicle A is running. By referring to the information on the acquired traffic signal, the driving assisting device may not provide the alarm if the vehicle A is stopped. For example, as shown in FIG. 7A, on the condition that the vehicle A is stopped according to the traffic signals and that the pedestrian is walking across crosswalk in front of the vehicle A and is approaching to the vehicle A, the driving assisting device may decrease the threshold level of the triggering condition for providing the alarm or may not provide the alarm at all even if the pedestrian is not positioned within the virtual viewing frustum of the driver of the vehicle A. Likewise, as shown in FIG. 7A, on the condition that vehicle C is running straight forward in another lane, the driving assisting device 100 may decrease the threshold level of the triggering condition for providing the alarm or may not provide the alarm at all even if a distance between the vehicle C and the vehicle A becomes lower than a preset threshold value.

Figure 7B:
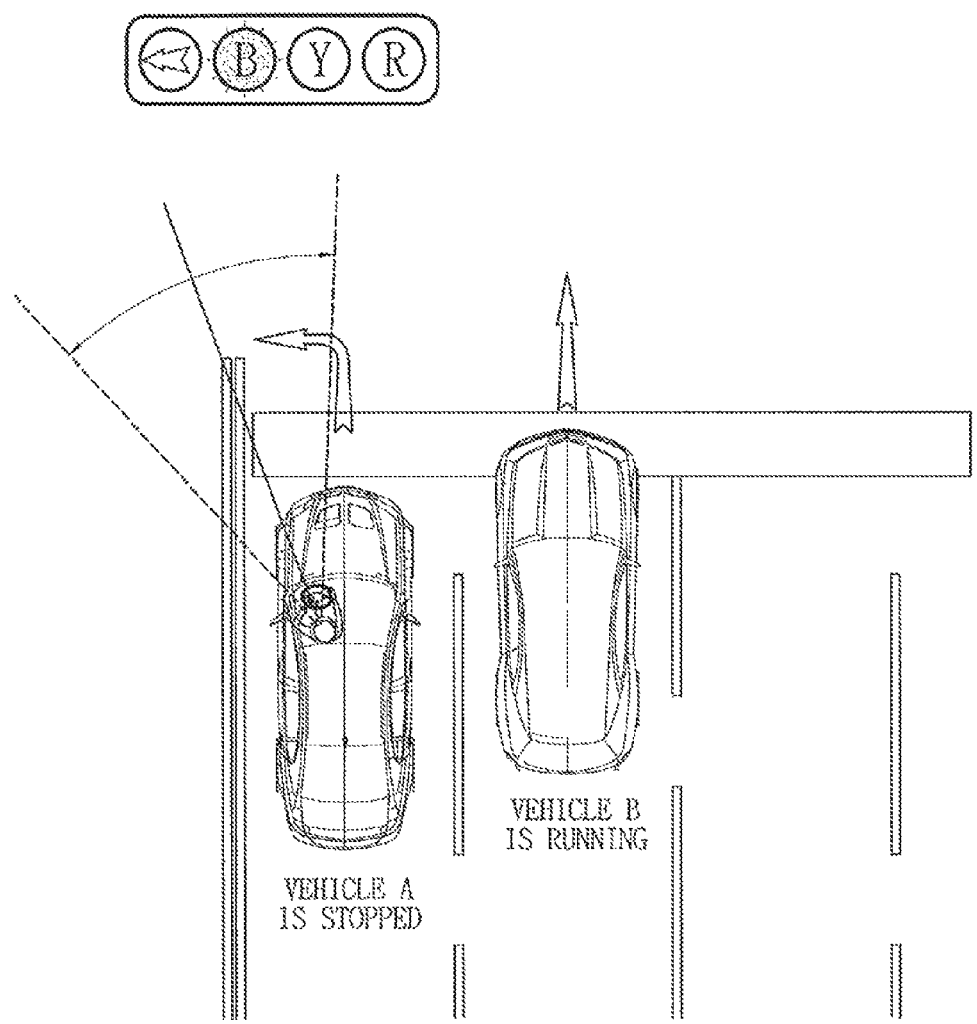

FIG. 7B is a drawing illustrating an example in which a vehicle A with the driving assisting device is stopped due to a traffic light and a vehicle B is running on the next lane. In FIG. 7B, the driving assisting device may farther acquire the information on traffic signal of the roads on which the vehicle A is running via the external cameras etc. of the vehicle A.

In case that the vehicle A is stopped to wait for a left turn signal and the vehicle B is running straight ahead in the next lane as shown in FIG. 7B, or in case that the vehicle B is running straight forward along a lane in an opposite direction to the vehicle A across the center line (not shown), the driving assisting device 100 may decrease the threshold level of the triggering condition for providing the alarm or may not provide the alarm at all even if it is determined that the gazing direction of the driver of the vehicle A is not directed towards the vehicle B and that the vehicle B is detected as being approaching to the vehicle A.

As such, a driver is usually more likely to look elsewhere than the front of the driver's vehicle when the driver's vehicle is in a static state according to the traffic signal. For such a case, unnecessary alarm may be avoided by the driving assisting device 100 because the possibility of collision is considerably low between external object and the driver's vehicle even if a distance between the external object and the driver's vehicle is decreasing.

Figure 8:
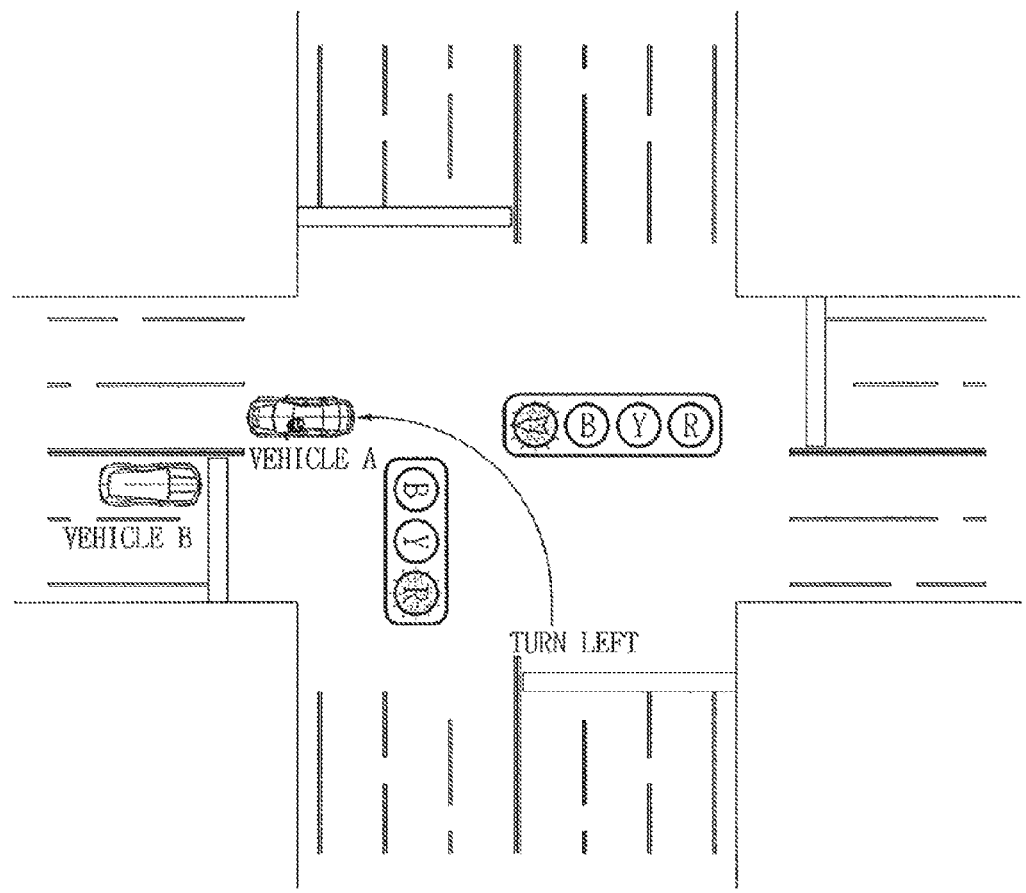

FIG. 8 is a drawing illustrating an instance in which a vehicle A with the driving assisting device is turning left according to a traffic signal and a vehicle B is stopped.

Referring to FIG. 8, the driving assisting device 100 may further acquire information on the traffic signal of the roads on which the vehicle A is running via the external cameras of the vehicle A. And the driving assisting device 100 may determine a location of the vehicle B and a distance between the vehicle B and the vehicle A from image data acquired from the external cameras. Further, even if it is determined that the vehicle B is detected as being located outside the virtual viewing frustum of the driver of the vehicle A and the vehicle B is detected as being close to the vehicle A by a preset threshold distance, if the vehicle is in a static state according to the traffic light, the driving assisting device may decrease the threshold level of the triggering condition for providing the alarm or may not provide the alarm at all.

Despite the fact that the vehicle B is not watched by the driver of the vehicle A, that is, even if the vehicle B falls out of the line of sight of the driver of the vehicle A, the driving assisting device of the vehicle A may not provide the alarm since it assumes there is little chance of collision in a normal driving situation. Accordingly, necessary alarming may be eliminated.

Though it is not shown, as another example, on the condition that the specific object is detected outside the virtual viewing frustum which corresponds to the gazing direction of the driver, the driving assisting device may maintain or increase the threshold level of the triggering condition for providing the alarm if the distance between the specific object and the vehicle is determined as being less than a fourth predetermined distance and if the specific object is detected as being in motion.

On the condition that the specific object is detected outside the virtual viewing frustum which corresponds to the gazing direction of the driver, the driving assisting device may provide the alarm if the distance between the specific object and the vehicle is determined as being less than a fifth predetermined distance and if the specific object is detected as being in motion.

Herein, the specific object mentioned above may be another vehicle in front of the vehicle of the driver and the two vehicles are moving slowly in traffic jam.

In detail, if the distance between the vehicle of the driver and another vehicle is determined as being less than the fourth predetermined distance and then if another vehicle is detected as moving forward to a direction leaving the vehicle of the driver, the driving assisting device including the black box may determine whether to increase or to maintain the threshold level of the triggering condition for providing the alarm if the driver does not focus on the driving. And if the distance between another vehicle and the vehicle of the driver is determined as being less than the fifth predetermined distance and then if another vehicle is detected as moving forward, the driving assisting device including black box may provide the alarm. Herein, the fifth predetermined distance is larger than the fourth predetermined distance.

Moreover, if the distance between the vehicle of the driver and another vehicle is determined as being less than the fourth predetermined distance and then if another vehicle is detected as moving backward to a direction approaching the vehicle of the driver, the driving assisting device including the black box may determine whether to increase or to maintain the threshold level of the triggering condition for providing the alarm if the driver does not focus on the driving. And if the distance between another vehicle and the vehicle of the driver is determined as being less then the fifth predetermined distance and then if another vehicle is detected as moving backward, the driving assisting device including black box may provide the alarm immediately. Herein the fourth predetermined distance is larger than the fifth predetermined distance.

For other black boxes, the alarm may keep ringing even if the specific object lies within the virtual viewing frustum of the driver. However, for the driving assisting device mentioned above, the alarm may not ring on if the driver is focusing on the driving in the traffic jam.

The present invention has an effect of assisting the vehicle driver in safe driving by providing alarm in case that the external object located outside the virtual viewing frustum is approaching to the vehicle driver.

Besides, the present invention also has another effect of providing the alarm for the vehicle driver even in case of sudden appearance of the external object that the vehicle driver is unable to recognize.

In addition, the present invention still has another effect of preventing the driving assisting device from providing unnecessary alarm even if the external object located outside the virtual viewing frustum is approaching to the vehicle driver, in case the external object or the vehicle is determined as being in a normal driving mode by referring to the traffic signal, the information on lane the like.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled artisan in a pertinent field. Computer readable record media include magnetic media such as hard disk, floppy disk, and magnetic tape, optical media such as CD-ROM and DVD, magneto-optical media such as floptical disk and hardware devices such as ROM, RAM, and flash memory specially design to store and carry out programs. Program commands include not only a machine language codes made by a complier but also a high level codes that can be used by an interpreter etc., which is executed by a computing device. The aforementioned hardware device can work as more than a software module to perform the technical features of the present invention and they can do the same in the opposite case.

As seen above, the present invention has been specifically described by such matters as detailed components, limited embodiments, and drawings. While the invention has been shown and described with respect to the preferred embodiments, it, however, may be appreciated by those skilled in the art that various changes and modifications may be made without departing from the spirit and the scope of the present invention as defined in the following claims.

Accordingly, the thought of the present invention must not be confined to the explained preferred or example embodiments, and the following patent claims as well as everything including variations equal or equivalent to the patent claims pertain to the category of the thought of the present invention.

What is claimed is:

1. A driving assisting method using a driving assisting device, comprising steps of:
    (a) the driving assisting device performing processes of (i) determining a gazing direction of a driver of a vehicle and (ii) identifying a location of a specific object and determining a distance between the specific object and the vehicle; and
    (b) the driving assisting device (i) maintaining or increasing a threshold level of a triggering condition for providing alarm or (ii) providing the alarm according to the threshold level of the triggering condition, (1) if the location of the specific object is detected as being outside a virtual viewing frustum corresponding to the gazing direction of the driver and (2) if the distance between the specific object and the vehicle is determined as being less than at least one predetermined distance.

2. The method of claim 1, wherein, at the step of (b), the driving assisting device, on the condition that the specific object is detected outside virtual viewing frustum corresponding to the gazing direction of the driver, (i) performs a process of maintaining or increasing the threshold level of the triggering condition for providing the alarm if the distance between the specific object and the vehicle is determined as being less than a first predetermined distance, and (ii) performs a process of providing alarm it the distance between the specific object and the vehicle is determined as being less than a second predetermined distance.

3. The method of claim 2, wherein, at the step of (b), if the specific object is predicted to be within a third predetermined distance from the vehicle after a certain time by referring to the location of the specific object and a change in the distance between the specific object and the vehicle, the driving assisting device informs the driver of the specific object.

4. The method of claim 3, wherein, at the step of (b), volume of the alarm is adjustable by referring to information on the distance between the specific object and the vehicle.

5. The method of claim 1, wherein the gazing direction of the driver is recognized from images of the driver obtained through an internal camera of the vehicle, and wherein the location of the specific object and the distance between the specific object and the vehicle are recognized from front images of the vehicle obtained through an external camera of the vehicle.

6. The method of claim 1, wherein, at the step of (b), the driving assisting device, even if the specific object is determined as being located within the virtual viewing frustum, sets information on the location of the specific object as being outside the virtual viewing frustum in case that the gazing direction of the driver is detected as being diverted by more than a predetermined upper angle or a predetermined lower angle from a central axis of a specific virtual viewing frustum acquired when the driver is looking straight forward.

7. The method of claim 1, wherein, at the step of (a), the driving assisting device further performs a process of obtaining information on traffic signals of roads on which the vehicle is running; and wherein, at the step of (b), in case the vehicle is determined as being in a static state according to the information on the traffic signals, the alarm is prevented from being provided or the threshold level of the triggering condition for providing alarm is lowered.

8. The method of claim 7, wherein the information on the traffic signals is acquired from images of traffic lights which are obtained through an external camera of the vehicle.

9. The method of claim 1, wherein, at the step of (a), the driving assisting device further performs a process of obtaining information on the traffic signals of the roads on which the vehicle is running; and wherein, at the step of (b), in case the vehicle is determined as being in a moving state and the specific object is determined as being in a static state according to the information on the traffic signals, the alarm is prevented from being provided or the threshold level of the triggering condition for providing alarm is lowered.

10. The method of claim 9, wherein the information on the traffic signals acquired from images of traffic lights obtained through an external camera of the vehicle.

11. The method of claim 1, wherein, at the step of (a), the driving assisting device further performs a process of obtaining lane information on the roads on which the vehicle is running; and wherein, at the step of (b), in case that the specific object is determined as another vehicle running in an opposite direction lane by referring to the lane information on the roads, (i) if a difference between a moving direction of the specific object and a lane direction included in the lane information on the roads exceeds a first preset threshold angle and the specific object is determined as moving away from a center line, or (ii) if a difference between the moving direction of the specific object and the lane direction included in the lane information on the roads is lower than a second preset threshold angle, the driving assisting device decreases the threshold level of the triggering condition for providing the alarm.

12. The method of claim 1, wherein, at the step of (a), the driving assisting device further performs a process of obtaining lane information on the roads on which the vehicle is running; and wherein, at the step of (b), in case that the specific object is determined as another vehicle running in an opposite direction by referring to the lane information on the roads, if a difference between the moving direction of the specific object and the lane direction included in the lane information on the roads exceeds a third preset threshold angle and the specific object is determined as moving towards the center line, the driving assisting device increases the threshold level of the triggering condition for providing the alarm or provides the alarm according to the threshold level of the triggering condition.

13. The method of claim 1, wherein the virtual viewing frustum includes (i) a direct virtual viewing frustum corresponding to the gazing direction of the driver of the vehicle and (ii) an indirect virtual viewing frustum acquired through any reflection component of the vehicle.

14. the method of claim 13, wherein, at the step of (b), Whether the location of the specific object is outside the virtual viewing frustum is determined by referring to at least part of (i) information on whether the direct virtual viewing frustum corresponding to a direct line of sight of the driver includes the specific object or not and (ii) information on whether the indirect virtual viewing frustum corresponding to the indirect line of sight of the driver which is generated by any reflection component of the vehicle includes the specific object or not.

15. The method of claim 1, wherein, at the step of (b), the driving assisting device, on the condition that the specific object is detected outside the virtual viewing frustum corresponding to the gazing direction of the driver, (i) performs a process of maintaining or increasing the threshold level of the triggering condition for providing the alarm if the distance between the specific object and the vehicle is determined as being less than a fourth predetermined distance and if the specific object is detected as being in motion, and (ii) performs a process of providing the alarm if the distance between the specific object and the vehicle is determined as being less than a fifth predetermined distance and if the specific object is detected as being in motion.

16. A driving assisting device, comprising:
a communication part for acquiring information on a driver of a vehicle and information on a specific object outside the vehicle; and
a processor for performing processes of (I) (i-1) determining a gazing direction of the driver and (i-2) identifying a location of the specific object and determining a distance between the specific object and the vehicle; and (II) (ii-1) maintaining or increasing a threshold level of a triggering condition for providing alarm or (ii-2) providing the alarm according to the threshold level of the triggering condition, if the location of the specific object is detected as being outside a virtual viewing frustum corresponding to the gazing direction of the driver and if the distance between the specific object and the vehicle is determined as being less than at least one predetermined distance.

17. The device of claim 16, wherein, the process of (II), the processor, on the condition that the specific object is detected outside virtual viewing frustum corresponding to the gazing direction of the driver, (ii-1) performs a process of maintaining or increasing the threshold level a the triggering condition for providing the alarm if the distance between the specific object and the vehicle is determined as being less than a first predetermined distance, and (ii-2) performs a process of providing alarm if the distance between the specific object and the vehicle is determined as being less than a second predetermined distance.

18. The device of claim 17, wherein, at the process of (II), the specific object is predicted to be within a third predetermined distance from the vehicle after a certain time by referring to the location of the specific object and a change in the distance between the specific object and the vehicle, the driving assisting device informs the driver of the specific object.

19. The device of claim 18, wherein, at the process of (II), volume of the alarm is adjustable by referring to information on the distance between the specific object and the vehicle.

20. The device of claim 16, wherein the gazing direction of the driver is recognized from images of the driver obtained through an internal camera of the vehicle, and wherein the location of the specific object and the distance between the specific object and the vehicle are recognized from front images of the vehicle obtained through an external camera of the vehicle.

21. The device of claim 16, wherein, at the process of (II), the processor, even if the specific object is determined as being located within a specific virtual viewing frustum, sets information on the location of the specific object as being outside the specific virtual viewing frustum in case that the gazing direction of the driver of the vehicle is detected as being diverted by more than a predetermined upper angle or a predetermined lower angle from a central axis of the specific virtual viewing frustum acquired by the driver looking straight forward.

22. The device of claim 16, wherein, at the process of (I), the processor is further configured to perform a process of obtaining information on traffic signals of roads on which the vehicle is running; and wherein, at the process of (II), in case the vehicle is determined as being in a static state according to the information on the traffic signals, the alarm is prevented from being provided or the threshold level of the triggering condition for providing alarm is lowered.

23. The device of claim 22, wherein the information on the traffic signals is acquired from images of traffic lights which are obtained through an external camera of the vehicle.

24. The device of claim 16, wherein, at the process of (I), the processor is further configured to perform a process of obtaining information on the traffic signals of the roads on which the vehicle is running; and wherein, at the process of (II), in case the vehicle is determined as being in a moving state and the specific object is determined as being in a static state according to the information on the traffic signals, the alarm is prevented from being provided or the threshold level of the triggering condition for providing alarm is lowered.

25. The device of claim 24, wherein the information on the traffic signals acquired from images of traffic lights obtained through an external camera of the vehicle.

26. The device of claim 16, wherein, at the process of (I), the processor is further configured to perform a process of obtaining lane information on the roads on which the vehicle is running; and wherein, at the process of (II), in case that the specific object is determined as another vehicle running on an opposite direction lane across a center line by referring to the lane information on the roads, the processor further performs a process of (ii-3) decreasing the threshold level of the triggering condition for providing the alarm, if a difference between a moving direction of the specific object and a lane direction included in the lane information on the roads exceeds a first preset threshold angle and the specific object is determined as moving away from the center line, or if a difference between the moving direction of the specific object and the lane direction included in the lane information on the roads is lower than a second preset threshold angle.

27. The device of claim 16, wherein, at the process of (I), the processor is further configured to perform a process of obtaining lane information on the roads on which the vehicle is running; and wherein, at the process of (II), in case that the specific object is determined as another vehicle running on an opposite direction lane by referring to the lane information on the roads, the processor further performs a process of (ii-4) increasing the threshold level of the triggering condition for providing the alarm or (ii-5) providing the alarm according to the threshold level of the triggering condition, if a difference between the moving direction of the specific object and the lane direction, included in the lane information on the roads exceeds a third preset threshold angle and the specific object is determined as moving towards the center line.

28. The device of claim 16, wherein the virtual viewing frustum includes (i) a direct virtual viewing frustum corresponding to the gazing direction of the driver of the vehicle and (ii) an indirect virtual viewing frustum acquired through any reflection component of the vehicle.

29. The device of claim 28, wherein, at the process of (II), whether the location of the specific object is outside the virtual viewing frustum is determined by referring to at least part of (i) information on whether the direct virtual viewing frustum corresponding to a direct line of sight of the driver includes the specific object or not and (ii) information on whether the indirect virtual viewing frustum corresponding to the indirect line of sight of the driver which is generated by any reflection component of the vehicle includes the specific object or not.

30. The device of claim 16, wherein, at the process of (II), on the condition that the specific object is detected outside the virtual viewing frustum corresponding to the gazing direction of the driver, the processor is configured to (i) perform process of maintaining or increasing the threshold level of the triggering condition for providing the alarm if the distance between the specific object and the vehicle is determined as being less than a fourth predetermined distance and if the specific object is detected as being in motion, and to (ii) perform a process of providing the alarm if the distance between the specific object and the vehicle is determined as being less than a fifth predetermined distance and if the specific object is detected as being in motion.

* * * * *